(12) United States Patent
Betremieux et al.

(10) Patent No.: US 6,852,812 B2
(45) Date of Patent: Feb. 8, 2005

(54) LATEX HAVING A HIGH SOLIDS CONTENT AND A LOW VISCOSITY AND EXHIBITING A BIMODAL DISTRIBUTION

(75) Inventors: Isabelle Betremieux, Coye la Foret (FR); Karine Loyen, Pont-Audemer (FR); Nathalie Meeschaert, Serquigny (FR); Pierre Nogues, Bernay (FR); Martine Schneider, Lyons (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 10/798,152

(22) Filed: Mar. 11, 2004

(65) Prior Publication Data

US 2004/0209986 A1 Oct. 21, 2004

Related U.S. Application Data

(62) Division of application No. 10/168,604, filed as application No. PCT/FR00/03587 on Dec. 19, 2000, now abandoned.

(30) Foreign Application Priority Data

Dec. 27, 1999 (FR) ............................................. 99 16520

(51) Int. Cl.$^7$ ...................... C08F 265/00; C08F 291/00; C08F 2/24; C08F 4/00; C09J 151/00
(52) U.S. Cl. .................... 526/201; 526/209; 526/218.1; 526/219.2; 526/219.5; 526/219.6; 526/225; 526/227
(58) Field of Search ................................. 526/201, 209, 526/218.1, 219.2, 219.5, 219.6, 225, 227

(56) References Cited

U.S. PATENT DOCUMENTS

| | | | |
|---|---|---|---|
| 4,039,475 A | | 8/1977 | Oosterwijk et al. ......... 252/431 |
| 4,092,470 A | | 5/1978 | Oosterwijk et al. ......... 526/227 |
| 4,395,500 A | * | 7/1983 | Löhr et al. .................. 523/221 |
| 4,456,726 A | * | 6/1984 | Siol et al. ................... 524/501 |
| 5,889,107 A | * | 3/1999 | Jakob et al. ................ 524/783 |

FOREIGN PATENT DOCUMENTS

| | | | | |
|---|---|---|---|---|
| DE | 197 27 060 A1 | 1/1999 | ............. | C08F/4/40 |
| EP | 0 010 986 A1 | 5/1980 | ............. | C08F/2/24 |
| EP | 0 568 834 A1 | 11/1993 | ......... | C08F/265/06 |
| EP | 0 814 096 A1 | 12/1997 | ............. | C08F/2/22 |
| EP | 0 814 103 A3 | 12/1997 | ......... | C08F/291/00 |
| EP | 0 814 103 A2 | 12/1997 | ......... | C08F/291/00 |
| EP | 0 818 471 A1 | 1/1998 | ............. | C08F/2/22 |
| EP | 0 953 604 A2 | 11/1999 | ........... | C08L/69/00 |
| FR | 2267329 | 11/1975 | ............. | C08F/1/11 |
| GB | 1419145 | 12/1975 | ........... | C08F/36/18 |
| GB | 1419145 A | * 5/1977 | ........... | C08D/01/09 |
| GB | 2055387 | 3/1981 | ......... | C08F/279/04 |
| WO | 98/07767 | 2/1998 | ......... | C08F/220/12 |
| WO | 98/16560 | 4/1998 | ............. | C08F/2/22 |

OTHER PUBLICATIONS

Woods, Martin, et al., *Rheological Studies on Dispersions of Uniform Colloidal Spheres*, Journal of Colloid and Interface Science, vol. 34, No. 1, Sep. 1970, pp. 91–99.

Johnson, Paul H., et al, *The Influence of Particle Size on the Viscosity of Synthetic Lates*—$I^1$, Rubber World, Sep., 1958, pp. 877–882.

Eagland, D., et al., *The Rheological Properties of Concentrated Polymer Dispersions*, Journal of Colloid and Interface Science, vol. 34, No. 2, Oct. 1970, pp. 249–261.

* cited by examiner

*Primary Examiner*—Kelechi C. Egwim
(74) *Attorney, Agent, or Firm*—Whyte Hirshboeck Dudek SC

(57) ABSTRACT

A process is presented for the preparation of a latex by the emulsion polymerization at a temperature of between 30 and 90 C. of at least one ethylenically unsaturated monomer in the presence of at least one surfactant and of a seed of polymer particles with a diameter of between 200 and 450 nm. The seed particles represent from 5–25% by weight of the total weight of the monomer and seed. The polymerization is initiated by a mixed water-soluble/fat-soluble system. Also included are lattices obtained from this process.

24 Claims, No Drawings

LATEX HAVING A HIGH SOLIDS CONTENT AND A LOW VISCOSITY AND EXHIBITING A BIMODAL DISTRIBUTION

CROSS-REFERENCE TO RELATED U.S. PATENT APPLICATIONS

This application is a Divisional of U.S. patent application Ser. No. 10/168,604, filed Oct. 9, 2002, abandoned, which is a 371 PCT/FR00/03587 filed Dec. 19, 2000.

The invention relates to the field of latices with a high solids content and with a low viscosity and in particular to latices comprising polymer particles dispersed according to a bimodal particle size distribution. It also relates to a process for the synthesis of such latices and to their applications.

According to the invention, the term "latex with a high solids content" is understood to mean aqueous dispersions of polymer particles comprising at least 55% by weight of said particles.

The synthesis of a latex with a high solids content very often presents viscosity problems. This is because, at these solids contents, the viscosity reaches very high values, which presents stirring problems during the synthesis process and also applicational problems.

In order to obtain both high solids contents and low viscosities, it is well known that the particle size of the latices must observe certain rules (see, on that subject, in particular Woods, M. E., Krieger, I. M., J. Colloid Interface Sci., 34, 91 (1970), Johnson, P. H., Kesley, R. H., Rubber World, 138, 877 (1958), England, D., Kay, M., J. Colloid and Interface Sci., 34, 249, (1970)), such that:

At identical solids contents, a latex with a large particle size is more fluid than a latex with a small particle size.

A latex composed of a mixture of two populations of particles is more fluid than a latex composed of a single population of particles, provided that the small particles do not represent more than 30 to 20% of the fraction by volume of the particles and that the ratio in size of the large particles to the small particles is sufficiently high.

A latex composed of two populations of particles is more viscous than a latex composed of three population, provided that the criteria of concentration and of differences in sizes described above are observed.

In short, the preparation of a latex having both a high solids content and a low viscosity remains a difficult problem. However, numerous documents have attempted to solve it. Thus, EP 568 834 A1, EP 814 103 A2, EP 818 471 A1 and WO 9816560 disclose the use of seed dispersions with different particle size which are introduced at the start or during the synthesis, these seeds grow larger as the monomers and initiators, of water-soluble type, are run in, which makes it possible to obtain final particle sizes which result in a good solids content/viscosity compromise.

In application EP 814 096, products with a high solids content and a low viscosity are obtained by virtue of a single-stage process with the use of a water-miscible cosolvent introduced into the preemulsion of monomers.

In application WO 9807767, products with a high solids content and a low viscosity are obtained by virtue of a single-stage process with a very low amount of inhibitor with respect to the monomers (<50 ppm) and flow rates for introduction of the preemulsion of monomers which gradually increase over time.

DE 19727060 discloses a process for the production of aqueous polymer dispersions having an essentially monomodal particle size distribution and a diameter of greater than 400 nm by emulsion polymerization using two initiating systems, the first of which is a redox system, in the presence of 0.01. to 2% by weight of the total weight of seed and monomers of a seed with a diameter of between 10 and 100 nm.

The main problem which the invention attempts to solve is that of obtaining a latex with a suitable bimodal distribution by a simple and easily controllable polymerization process.

This is because the Applicant Company has found that a latex with two populations can exhibit a good solids content/viscosity compromise if it is composed of a population of large particles, the size of which is greater than 500 nm, and of a population of small particles, the size of which is less than 250 nm. The solids content/viscosity compromise is even better if the large particles mean diameter/small particles mean diameter ratio is greater than 3, preferably greater than 4.

In point of fact, it is well known to a person skilled in the art that it is difficult, in emulsion polymerization, to obtain large particle sizes (>450 nm) with short manufacturing times and in particular in the presence of particles with a smaller size. The present invention provides a solution to this problem based on the use of specific initiating systems combining water-soluble initiators and fat-soluble initiators.

The Applicant Company has found that the abovementioned problems can be solved by emulsion polymerization in the presence of a seed having a well defined mean diameter. The polymerization being initiated by a mixture of two initiating systems, one water-soluble and the other fat-soluble.

The advantage of this invention with respect to the prior art using seeds is that, by virtue of the use of mixed water-soluble/fat-soluble initiating systems, the enlarging of populations with different size originating from seeds becomes easier to control. For this, it is sufficient to dissolve the fat-soluble initiator in one of the populations to promote its growth at the expense of that of the others. This is particularly advantageous since, in the case of a mixture of small and large particles, it is difficult, with water-soluble initiating conventional in emulsion polymerization, to bring about the growth of large particles. This is because, in this case, most of the monomers are consumed by the small particles because they have a greater capture surface area. This phenomenon is all the more of a nuisance since, in order to obtain a very low viscosity with a high solids content, it is necessary (see above) to obtain a concentration by volume of large particles of greater than 75% and better still greater than 80%.

Furthermore, the solution provided by the Applicant Company does not require the use of a cosolvent which generates volatile products during the use of a latex and that neither does it require the presence of an inhibitor in the monomers, which renders it much more advantageous from a safety viewpoint on an industrial plant.

One of the subject matters of the invention is a latex composed of an aqueous dispersion comprising at least 55% by weight of polymer particles distributed in the following way:

A—from 5 to 30% by weight have a mean diameter of between 100 and 250 nm,

B—from 75 to 95% by weight have a mean diameter of greater than 500 nm,

C—from 0 to 5% by weight have a mean diameter of between 250 and 500 nm,

D—from 0 to 5% by weight have a mean diameter of less than 100 nm.

The mean diameter of the B particles (dB)/mean diameter of the A particles (dA) ratio is between 3 and 10 and preferably greater than 4.

According to a preferred form, the latex of the invention includes from 10 to 15% by weight of particles (A) and from 75 to 90% of particles (B).

By reducing the amount of A, C and D particles to a minimum, the latex of the invention becomes an essentially monomodal latex having a mean diameter of greater than 500 nm.

Another of the subject matters of the invention is a process for obtaining a latex such as that described above based on the controlled growth of a or of a mixture of populations of particles which are obtained either by the introduction of seeds or by successive renucleations during the same manufacturing sequence. Renucleation makes it possible, at various stages in the polymerization, to manufacture small polymer particles.

The populations of particles are thus obtained either by addition of seed of different sizes at the beginning and/or during the polymerization process in an aqueous dispersion or by micellar or coagulative nucleation, brought about at various moments in the synthesis process, according to the amounts and the nature of the surfactants introduced but also according to the nature of the monomers, as is known by a person skilled in the art.

The polymerization being provided by a mixed system of water-soluble/fat-soluble initiators.

According to one form, the process of the invention is carried out by the polymerization of at least one ethylenically unsaturated monomer in the presence of 5 to 25% by weight with respect to the total weight of the polymers of a seed composed of polymer particles with a mean diameter of between 200 and 450 nm.

It being possible for the seed to be introduced at the beginning of the polymerization or during the polymerization but before achieving the polymerization of 80% of the monomers to be polymerized.

It being possible for the seed to be introduced either in the form of a latex or in the form of a redispersible powder or else prepared in situ by emulsion polymerization.

The mixed initiating systems chosen subsequently make it possible to bring about the growth of the particles in order to obtain the final particle size of the latex which will result in the desired rheological and applicative properties.

The mixed initiating systems are composed of one or more water-soluble initiator systems and of one or more fat-soluble initiators which can be introduced simultaneously during the synthesis process or according to well defined sequences.

The mixed system can be composed of a molar ratio of the water-soluble initiator to the fat-soluble initiator of between 0.01/1 and 1/0.01.

The water-soluble initiators are the initiators commonly used in emulsion polymerization, among which may be mentioned, nonexhaustively:

sodium, potassium and ammonium persulfates, water-soluble azo derivatives, such as 4,4'-azobis(4-cyanovaleric acid) or 2,2'-azobis(2-amidinopropane) dihydrochloride, for example.

The systems involving a reducing agent, an oxidizing agent and sometimes even an activating agent. The oxidizing agents are generally hydroperoxides, such as aqueous hydrogen peroxide solution, tert-butyl hydroperoxide, tert-amyl hydroperoxide, cumyl hydroperoxide or the sodium salt of the mixture of m- and p-diisopropylbenzene dihydroperoxid. The most commonly employed reducing agents are sodium formaldehydesulfoxylate, sodium metabisulfite or ascorbic acid. Activating agents are generally metal salts, such as iron sulfate, copper sulfate or cobalt acetate.

The fat-soluble initiators are chosen according to their solubility in the mixture of monomers to be polymerized and of the corresponding polymer. They are peroxides or hydroperoxides which are insoluble in water, peroxyesters, peroxydicarbonates or fat-soluble azo derivatives, such as azobisisobutyronitrile, azobiisobutyrodimethyl ester or azobiisobutyrodiethyl ester. Moreover, the latter will preferably be used when a mixture of monomers is to be polymerized which comprises a high proportion of acrylic or methacrylic derivatives because of their high solubility in these mixtures of monomers and of their polymer. Among azo initiators, azobisisobutyrodiethyl ester is often chosen because of its liquid state at ambient temperature, which makes it easier to handle.

In the case of fat-soluble initiators exhibiting high decomposition temperatures, it may also be necessary to use reducing agents, such as described in the context of the water-soluble initiators, in order to activate the polymerization reaction. A metal compound can advantageously increase the initiating rates.

The other important components of the formulation are, as for any polymerization in aqueous dispersion, the surfactants and the monomers.

As regards the surfactants, their nature and their level are to be optimized according to the desired particle size and also according to the nature of the monomers to be polymerized. Generally, it is preferable to use a mixture of anionic and nonionic surfactants. The anionic surfactants are chosen, for example, from alkylaryl ether sulfate or alkyl ether sulfates. The nonionic surfactants are chosen from ethoxylated alkylphenol or ethyoxylated fatty alcohols.

The level of surfactant used depends on the process. This is because, generally, if it is a matter of bringing about the growth of particles already present, it is more advantageous to use mainly a nonionic surfactant. On the other hand, if it is a matter of nucleating a population of particles, it is advantageous to use anionic surfactant.

The principle of this invention is general; however, the seed of large particles or the large particles generated in situ are predominantly composed of acrylic or methacrylic monomers because of the good solubility of the majority of fat-soluble initiators in these monomers and their polymers. For the subsequent stage of growth of the particles and of renucleation of one or more populations of smaller particles, the monomers used are not necessarily the same as those which are used during the preparation of the seed and can just as easily be the family of acrylic and methacrylics as of vinyl monomers, such as, for example, vinyl chloride, vinylidene fluoride or vinyl acetate, or of styrene monomers.

As regards the polymerization process, whether or not this is in the presence of seed, the monomers are introduced continuously into the reactor with a rate of addition similar to their rate of consumption.

The preferred process consists in preparing a seed of large, predominantly acrylic, particles in situ or ex situ, in causing it to expand with a mixture of monomers and fat-soluble initiator, in continuing the growth of these large particles by continuously adding a preemulsion of monomers and one or more water- and fat-soluble initiators, and in creating one or more populations of small particles by renucleation in the presence of surfactant or by injection of a second seed which is small in size.

It has been seen above that the choice of the initiators is a key element of the invention, and the time and the way in which they are introduced constitute parameters which are just as important.

This is because the choice will be made to introduce the fat-soluble initiator as one lot or by running in at the moments in the process where it is desired to bring about the growth of the large particles without renucleating small particles. On the other hand, the water-soluble initiator may be preferably introduced when it is desired to renucleate small particles where to bring about the growth of the latter at the expense of the larger particles. The water-soluble initiator and the fat-soluble initiator will be introduced in parallel when it is a matter of bringing about the growth of a mixture of large and of small particles at equivalent rates.

The fat-soluble initiator can be introduced in several ways; the preferred way consists in dissolving it in the seed of large particles; however, it is also possible to introduce it continuously into the process by dissolving it in the preemulsion of monomers or in the form of an emulsion or dispersion stabilized by a mixture of surfactants and/or of protective colloids, as disclosed in patents FR 74 12907, EP 010 986 or FR 76 07124.

The water-soluble initiator is introduced in the form of an aqueous solution, as one lot or by running in, as is known by a person skilled in the art.

The polymerization temperatures are between 30 and 90° C., according to the initiating system chosen.

A stage of removal of the residual monomers can be carried out at the end of running in the monomers either by a stationary temperature phase or by the introduction of polymerization initiators.

The present invention also relates to the use of the latices capable of being obtained according to the process defined above in adhesive applications, such as pressure-sensitive adhesives used to stick on labels or floor covering adhesives.

The following examples illustrate the invention without limiting the scope thereof.

EXAMPLES

The particle sizes are measured by separative capillary liquid chromatography using the CHDF 2000 apparatus supplied by Matec Applied Science.

The viscosity is measured with a Brookfield according to the ISO 2555 standard.

Example 1

Synthesis of the Seed Dispersion 1358.4 g of water, 10.0 g of a 30% aqueous solution of ethoxylated nonylphenol sulfate comprising 32 EO, 10.0 g of a 65% aqueous solution of ethoxylated nonylphenol comprising 30 EO and 41.5 g of sodium acetate trihydrate are introduced into a jacketed glass reactor equipped with a mechanical stirrer of anchor type. The contents are brought to 80° C. with stirring. 327.3 g of the preemulsion of monomers and 7.6 g of the sodium persulfate solution are added as one lot at this temperature. 10 minutes later, the remainder of the preemulsion is introduced continuously over a time of 5 h at 80° C., while the remainder of the sodium persulfate solution is introduced separately over 5 h 30.

| Preemulsion of monomers: | |
|---|---|
| Water | 2567.6 g |
| 30% Ethoxylated nonylphenol sulfate in water | 376.7 g |
| 65% Ethoxylated nonylphenol in water | 145.7 g |
| Methyl methacrylate | 800.0 g |
| 2-Ethylhexyl acrylate | 8100.0 g |
| Vinyl acetate | 800.0 g |
| Acrylic acid | 300.0 g |
| Sodium persulfate solution: | |
| Water | 272.0 g |
| Sodium persulfate | 35.0 g |

The seed resulting from this example has a solids content of 65.6% and a particle size of 410 nm.

Example 2

Synthesis of Latex with Two Populations in the Presence of a Mixed Initiating: Persulfate/DEAB DEAB is azobisisobutyrodiethyl ester 207.4 g of water, 376.0 g of the seed synthesized in Example I1 and 30.0 g of a solution of monomers and of fat-soluble initiator are introduced into a jacketed glass reactor equipped with a mechanical stirrer of anchor type. The contents are brought to 80° C. with stirring. All of the preemulsion of monomers is introduced continuously over a time of 4 h at 80° C., while the remainder of the sodium persulfate solution is introduced over 4 h 30.

2 h 30 after having begun to run in the preemulsion of monomers, 51.9 g of a surfactant solution are added as one lot to the reactor.

| Solution of monomers and of fat-soluble initiator: | |
|---|---|
| Methyl methacrylate | 2.2 g |
| Vinyl acetate | 2.2 g |
| 2-Ethylhexyl acrylate | 22.4 g |
| Acrylic acid | 0.8 g |
| DEAB | 2.4 g |
| Preemulsion of monomers: | |
| Water | 168.3 g |
| 30% Ethoxylated nonylphenol sulfate in water | 23.4 g |
| 65% Ethoxylated nonylphenol in water | 14.0 g |
| Methyl methacrylate | 74.6 g |
| Vinyl acetate | 74.6 g |
| 2-Ethylhexyl acrylate | 755.2 g |
| Acrylic acid | 28.0 g |
| DEAB | 2.4 g |
| Sodium persulfate solution: | |
| Water | 36.0 g |
| Sodium persulfate | 4.0 g |
| Surfactant solution: | |
| Water | 23.5 g |
| 30% Ethoxylated nonylphenol sulfate in water | 25.0 g |
| 65% Ethoxylated nonylphenol in water | 3.4 g |

The latex resulting from this example has a solids content of 67.0% and a Brookfield viscosity of 250 mPa.s.

Example 3

Synthesis of Comparative Latex with Two Populations in the Presence of a Simple Initiating: Sodium Persulfate 207.4 g of water, 376.0 g of the seed synthesized in Example 1, 1.20 g of sodium persulfate and 27.6 g of a solution of monomers are introduced into a jacketed glass reactor equipped with a mechanical stirrer of anchor type. The contents are brought to 80° C. with stirring. All of the preemulsion of monomers is introduced continuously over a time of 4 h at 80° C., while the remainder of the sodium persulfate solution is introduced over 4 h 30.

2 h 30 after having begun to run in the preemulsion of monomers, 51.9 g of a surfactant solution are added as one lot to the reactor.

| Solution of monomers and of fat-soluble initiator: | |
|---|---|
| Methyl methacrylate | 2.2 g |
| Vinyl acetate | 2.2 g |
| 2-Ethylhexyl acrylate | 22.4 g |
| Acrylic acid | 0.8 g |
| Preemulsion of monomers: | |
| Water | 168.3 g |
| 30% Ethoxylated nonylphenol sulfate in water | 23.4 g |
| 65% Ethoxylated nonylphenol in water | 14.0 g |
| Methyl methacrylate | 74.6 g |
| Vinyl acetate | 74.6 g |
| 2-Ethylhexyl acrylate | 28.0 g |
| DEAB | 2.4 g |
| Sodium persulfate solution: | |
| Water | 40.5 g |
| Sodium persulfate | 4.4 g |
| Surfactant solution: | |
| Water | 23.5 g |
| 30% Ethoxylated nonylphenol sulfate in water | 25.0 g |
| 65% Ethoxylated nonylphenol in water | 3.4 g |

The latex resulting from this example at a solids content of 66.3% and a Brookfield viscosity of 2200 mPa.s.

Particle Size Analysis

| Reference | Size (nm) Small particles/ Large particles | Distribution by weight (%) Small particles/ Large particles |
|---|---|---|
| Example 2 | 124/596 | 22/78 |
| Example 3 | 154/632 | 40/60 |

What is claimed is:

1. A process for the preparation of a latex by the emulsion polymerization at a temperature of between 30 and 90 C. of at least one ethylenically unsaturated monomer in the presence of at least one surfactant and of a seed of polymer particles with a diameter of between 200 and 450 nm representing from 5 to 25% by weight of the total weight of monomer and seed polymerization being initiated by a mixed water-soluble/fat-soluble system.

2. The process as claimed in claim 1, characterized in that the seed is introduced before the beginning of the polymerization.

3. The process as claimed in claim 1, characterized in that the seed is introduced after the beginning of the polymerization and before achieving 80% conversion of the monomers to be polymerized.

4. The process as claimed in claim 1, characterized in that the seed is introduced in the form of a latex.

5. The process as claimed in claim 1, characterized in that the seed is introduced in the form of a redispersible powder.

6. The process as claimed in claim 1, characterized in that the seed is prepared in situ by emulsion polymerization.

7. The process as claimed in claim 1, characterized in that the seed is composed essentially of (meth)acrylic polymers.

8. The process as claimed in claim 1, characterized in that the surfactant is chosen from anionic surfactants, selected from alkylaryl ether sulfate or alkyl ether sulfates, or non-ionic surfactants.

9. The process as claimed in claim 1, characterized in that the mixed system is composed of a molar ratio of the water-soluble initiator to the fat-soluble initiator of between 0.01/1 and 1/0.01.

10. The process as claimed in claim 1, characterized in that the water-soluble initiator is chosen from sodium, potassium and ammonium persulfates, or water-soluble azo derivatives.

11. The process as claimed in claim 1, characterized in that the fat-soluble initiator is chosen from peroxides and hydroperoxides which are insoluble in water, peroxyesters, peroxydicarbonates or fat-soluble azo derivatives.

12. The process of claim 10 wherein the water-soluble azoderivatives are 4,4'-azobis(4-cyanovaleric acid) or 2,2'-azobis(2-amidinopropane)dihydrochloride.

13. The process of claim 10 further comprising a reducing agent.

14. The process of claim 13 wherein the reducing agent is selected from sodium formaldehydesulfoxylate, sodium metabisulfite or ascorbic acid.

15. The process of claim 10 further comprising an oxidizing agent.

16. The process of claim 15 wherein the oxidizing agent is a hydroperoxide selected from the group consisting of aqueous hydrogen peroxide solution, tert-butyl hydroperoxide, tert-amyl hydroperoxide, cumyl hydroperoxide or the sodium salt of the mixture of n- and p-diisopropylbenzene dihydroperoxide.

17. The process of claim 10 further comprising an activating agent.

18. The process of claim 10 wherein the activating agent is a metal salt selected from iron sulfate, copper sulfate or cobalt acetate.

19. The process of claim 11 wherein the azo derivatives are selected from azobisisobutyronitrile, azobiisobutyrodimethyl ester or azobiisobutyrodienthyl ester.

20. The process of claim 8 wherein the anionic surfactant is selected from alkylaryl ether sulfate or alkyl ether sulfates.

21. The process of claim 8 wherein the nonionic surfactant is selected from ethoxylated alkylphenol or ethoxylated fatty alcohols.

22. A latex obtained by the process as defined in claim 1.

23. A latex obtained by the process as defined in claim 1, for use in adhesive applications.

24. A latex according to claim 23, wherein said adhesive applications comprise: pressure-sensitive adhesives used to stick on labels or floor covering adhesives.

* * * * *